(12) United States Patent
Nitschke et al.

(10) Patent No.: US 12,368,827 B2
(45) Date of Patent: Jul. 22, 2025

(54) METHOD FOR ACTUATING AN ACTUABLE DEFLECTION DEVICE OF AN OPTICAL SYSTEM FOR A VIRTUAL RETINAL DISPLAY

(71) Applicant: Robert Bosch GmbH, Stuttgart (DE)

(72) Inventors: Christian Nitschke, Kusterdingen (DE); Henning Kaestner, Reutlingen (DE); Jens Weber, Dusslingen (DE); Julian Heinzelmann, Stuttgart (DE); Marius Schmid, Burladingen (DE); Maximilian Rutz, Tuebingen (DE); Robert Wolf, Dresden (DE); Simon Pick, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 17 days.

(21) Appl. No.: 18/350,330

(22) Filed: Jul. 11, 2023

(65) Prior Publication Data

US 2024/0040089 A1   Feb. 1, 2024

(30) Foreign Application Priority Data

Jul. 26, 2022   (DE) .......................... 102022207607.9

(51) Int. Cl.
*H04N 9/31*   (2006.01)
*G02B 27/01*   (2006.01)

(52) U.S. Cl.
CPC ....... *H04N 9/3129* (2013.01); *G02B 27/0172* (2013.01); *G02B 27/0179* (2013.01); *H04N 9/3155* (2013.01); *H04N 9/3173* (2013.01); *G02B 2027/0178* (2013.01); *G02B 2027/0187* (2013.01)

(58) Field of Classification Search
CPC .. H04N 9/3129; H04N 9/3155; H04N 9/3173; G02B 27/0172; G02B 27/0179; G02B 2027/0178; G02B 2027/0187; G02B 26/101; G02B 27/0093
See application file for complete search history.

(56) References Cited

U.S. PATENT DOCUMENTS 6,140,979 A     10/2000  Gerhard et al.
2022/0155588 A1*  5/2022 Topliss ............... G02B 27/0093

FOREIGN PATENT DOCUMENTS

DE    102020205910 A1   11/2021
EP       3259633 B1      1/2021

* cited by examiner

*Primary Examiner* — Kyu Chae
(74) *Attorney, Agent, or Firm* — NORTON ROSE FULBRIGHT US LLP

(57) ABSTRACT

A method for actuating an actuable deflection device of an optical system for a virtual retinal display. A first eye status of the user of the virtual retinal display, detected and/or determined using an eye status detection device of the optical system, is received by way of a control unit of the optical system at a first time. In addition, first actuation signals are generated for the actuable deflection device using the control unit, in such a way that the scanning region of the deflection device is adjusted in accordance with the detected and/or determined first eye status of the user.

17 Claims, 6 Drawing Sheets

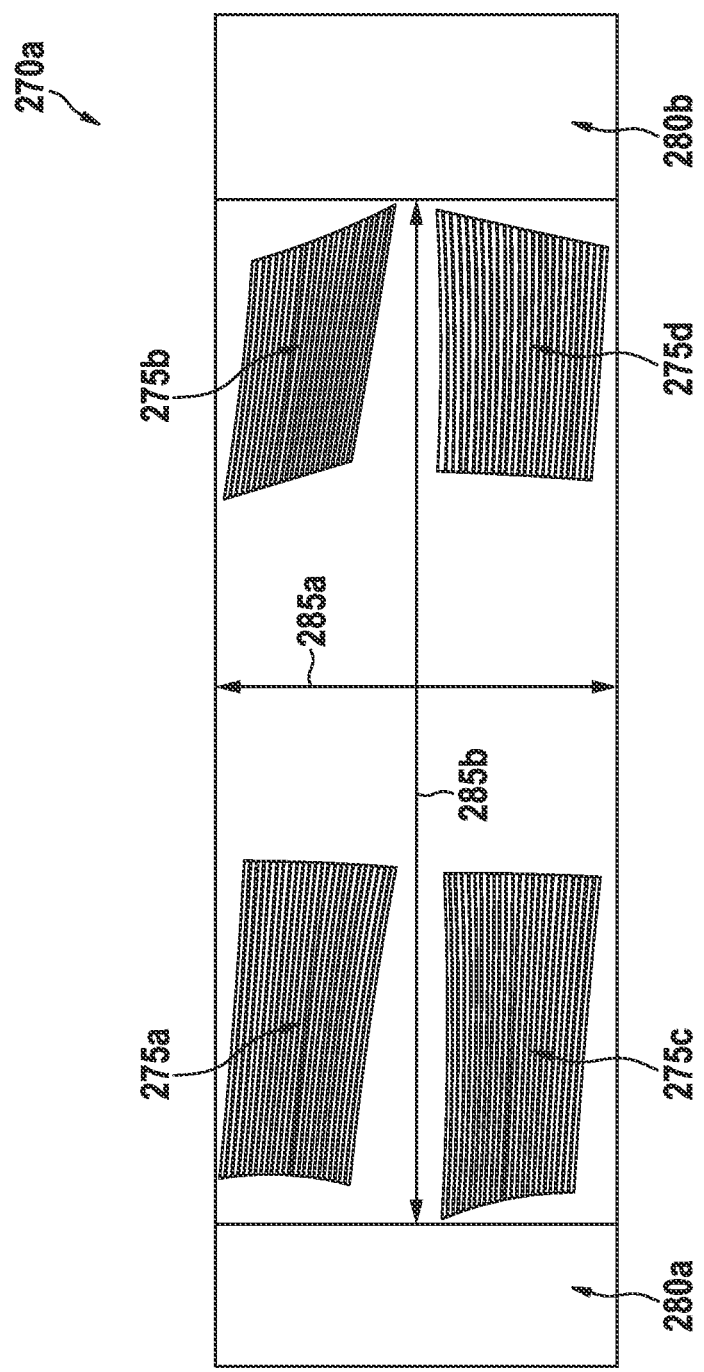

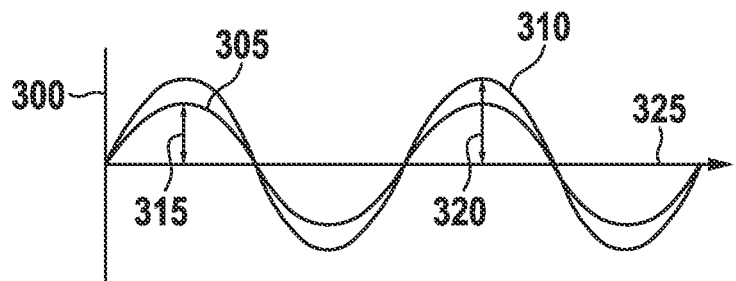
Fig. 4
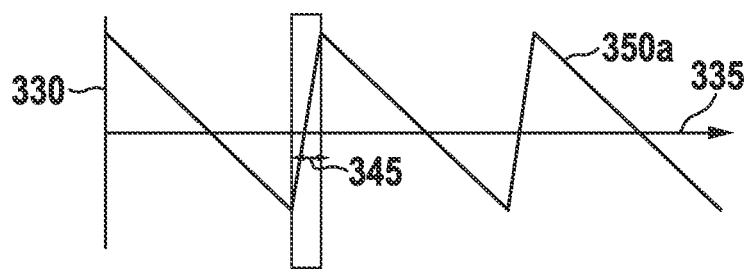
Fig. 5A
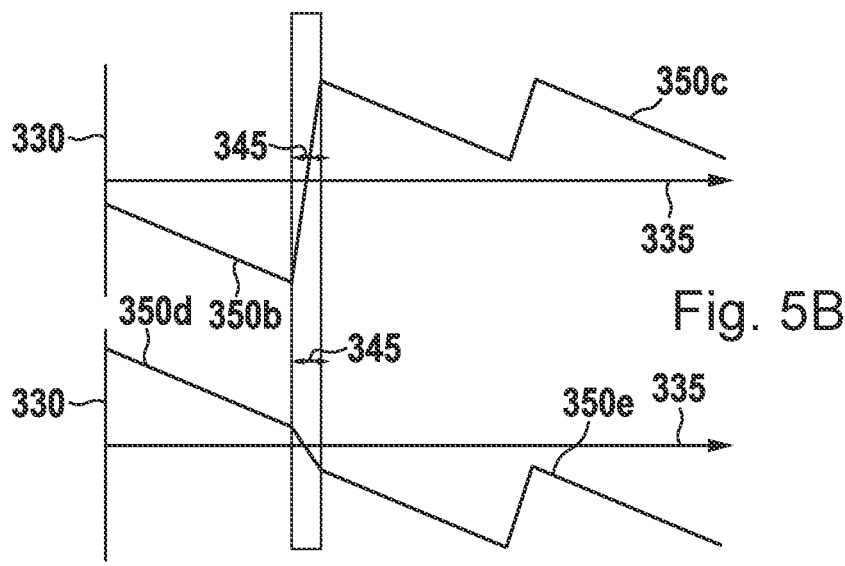
Fig. 5B
Fig. 5C

METHOD FOR ACTUATING AN ACTUABLE DEFLECTION DEVICE OF AN OPTICAL SYSTEM FOR A VIRTUAL RETINAL DISPLAY

CROSS REFERENCE

The present application claims the benefit under 35 U.S.C. § 119 of German Patent Application No. DE 10 2022 207 607.9 filed on Jul. 26, 2022, which is expressly incorporated herein by reference in its entirety.

FIELD

The present invention relates to a method for actuating an actuable deflection device of an optical system for a virtual retinal display. In addition, the present invention relates to a control unit for actuating an actuable deflection device of an optical system for a virtual retinal display, and to an optical system for a virtual retinal display.

BACKGROUND INFORMATION

European Patent No. EP 3 259 633 B1 describes an optical system for a virtual retinal display. In this document, a segment lens is used to enable different imaging paths and thus also a plurality of eye boxes for the user. In accordance with the user's pupil position, the scanning beam is blanked in certain portions of the segment lens if no eye box is to be displayed therein.

An object of the present invention is to develop a method for actuating an actuable deflection device of an optical system for a virtual retinal display that allows for greater projection line density and image resolution.

SUMMARY

To achieve the object, the present invention provides a method for actuating an actuable deflection device of an optical system for a virtual retinal display. In this regard, according to an example embodiment of the present invention, the optical system comprises an image source, which delivers an item of image content in the form of image data, and an image processing device for the image data. In addition, the optical system comprises a projector unit comprising a time-modulable light source for generating at least one light beam and comprising the actuable deflection device for the at least one light beam for the scanning projection of the image content over a scanning region. The 'scanning region' is in particular intended to refer to the movement range of the deflection device in a horizontal and a vertical direction, in particular along a horizontal and a vertical axis of rotation. The light beam deflected by way of the deflection device is then scanned along the scanning region via the optical segmentation element. In addition, the optical system comprises a diverting unit onto which the image content can be projected and which is configured for diverting the projected image content onto a user's eye in such a way that a plurality of exit pupils arranged so as to be spatially offset from one another and comprising the image content can be generated. In particular, these different exit pupils can be generated sequentially. Furthermore, the optical system comprises an eye status detection device for detecting and/or determining the eye status of the user. In particular, the eye status detection device is used for detecting and/or determining the movement of the eye, the speed of the eye movement, the pupil position, the pupil size, the direction of view, the accommodation status, and/or the fixation distance of the eye.

Moreover, according to an example embodiment of the present invention, the optical system comprises the aforementioned optical segmentation element, which is arranged between the projector unit and the diverting unit and by way of which the image content can be projected onto at least one projection region of the diverting unit via different imaging paths. In this case, at least some of the imaging paths can be actuated individually. In addition, the optical system comprises a control unit at least for actuating the actuable deflection device. In the method for actuating the actuable deflection device of the optical system for a virtual retinal display, a first eye status of the user, detected and/or determined using the eye status detection device, is firstly received by way of the control unit at a first time. Furthermore, first actuation signals are generated for the actuable deflection device using the control unit, in such a way that the scanning region of the deflection device is adjusted in accordance with the detected and/or determined first eye status of the user. Owing to this targeted adjustment of the scanning region, and thus of the movement range of the deflection device, in accordance with the first eye status of the user, the projection line density and the image resolution of the projected image content are increased.

Preferably, according to an example embodiment of the present invention, the scanning region of the deflection device is composed of a first, horizontal scanning region of a first micromirror device of the deflection device and a second, vertical scanning region of a second micromirror device of the deflection device. In other words, the first micromirror device is moved or rotated about a first, vertical axis of rotation, and the second micromirror device is moved or rotated about a second, horizontal axis of rotation. Thus, the scanning region is produced from the first, horizontal scanning region and from the second, vertical scanning region. In this context, the first actuation signals are preferably composed of third actuation signals for the first and fourth actuation signals for the second micromirror device. Preferably, first actuation signals are generated such that the first and the second micromirror device are tilted sinusoidally in resonant oscillations. In the process, the first and the second micromirror device are preferably tilted at a frequency of 20 kHz. Alternatively, the first actuation signals are generated such that the first micromirror device is tilted sinusoidally and the second micromirror device is tilted in the manner of a sawtooth in a quasi-static, periodic movement. In this case, the sawtooth-like tilt is preferably carried out at a frequency of 60 Hz. In a further alternative, the first actuation signals are generated such that the first micromirror device is tilted in the manner of a sawtooth and the second micromirror device is tilted sinusoidally. In a further alternative, the first actuation signals are generated such that the first and the second micromirror device are tilted in the manner of a sawtooth. Preferably, the scanning region of the deflection device is adjusted such that at least one part of the horizontal and/or vertical scanning region is made smaller. Alternatively, the scanning region of the deflection device is adjusted such that at least one part of the horizontal and/or vertical scanning region is made larger. Alternatively, the scanning region of the deflection device is adjusted such that at least one part of the horizontal and/or vertical scanning region is displaced. The result is a method that can react very flexibly to a changing eye status of the user.

Preferably, according to an example embodiment of the present invention, each of the different imaging paths is assigned a respective exit pupil (A, B) comprising the image content. In the process, the scanning region of the deflection device is adjusted such that at least one part of a first of the different imaging paths of the optical segmentation element is excluded from the scanning region of the deflection device. This means that, at least in part, the deflection device does not scan the light beam over at least one segment of the optical segmentation element. In this context, the vertical scanning region in particular is made smaller. Preferably, the scanning region of the deflection device is also adjusted such that at least the first imaging path of the optical segmentation element is excluded in its entirety from the scanning region of the deflection device. This means that the deflection device does not scan the light beam over at least one complete segment of the optical segmentation element. In addition, the image data are preferably activated for just one second imaging path of the different imaging paths. In this regard, the second imaging path is located within the scanning region of the deflection device. Therefore, in particular in the case of at least two segments located within a shared horizontal scanning region, it is possible to activate just one imaging path.

Preferably, according to an example embodiment of the present invention, there are at least four different imaging paths of the optical segmentation element. In this context, the optical segmentation element is preferably formed as a 2×2 segmentation lens.

Preferably, according to an example embodiment of the present invention, the first eye status of the user is detected and/or determined using an eye tracker device as the eye status detection device.

According to an example embodiment of the present invention, preferably, in a further method step, a second eye status of the user, detected and/or determined using the eye status detection device, is received by way of the control unit at a second time that follows the first time. In the process, second actuation signals are also generated for the actuable deflection device using the control unit, in such a way that the scanning region of the deflection device is adjusted in accordance with the detected and/or determined second eye status of the user. In this case, a second amplitude and/or a second frequency of a second tilt of the deflection device is changed compared with a first amplitude and/or a first frequency of a first tilt of the deflection device. The method thus allows the scanning region to be adjusted quickly if the eye status of the user changes.

The present invention further relates to a control unit for actuating an actuable deflection device of an optical system for a virtual retinal display. In particular, according to an example embodiment of the present invention, the control unit is configured for performing the above-described method for actuating an actuable deflection device of an optical system for a virtual retinal display. The control unit is configured for receiving, at a first time, a first eye status of the user detected and/or determined using an eye status detection device. In addition, the control unit is configured for generating first actuation signals for the actuable deflection device of the optical system in such a way that the scanning region of the deflection device is adjusted in accordance with the detected and/or determined first eye status of the user.

The present invention further relates to an optical system for a virtual retinal display (retinal scan display). In this regard, according to an example embodiment of the present invention, the optical system comprises an image source, which delivers an item of image content in the form of image data, and an image processing device for the image data. In addition, the optical system comprises a projector unit comprising a time-modulable light source for generating at least one light beam and comprising an actuable deflection device for the at least one light beam for the scanning projection of the image content over a scanning region. In addition, the optical system comprises a diverting unit onto which the image content can be projected and which is configured for diverting the projected image content onto a user's eye in such a way that a plurality of exit pupils arranged so as to be spatially offset from one another and comprising the image content can be generated. Furthermore, the optical system comprises an eye status detection device for detecting and/or determining the eye status of the user. In particular, the eye status detection device is used for detecting and/or determining the movement of the eye, the speed of the eye movement, the pupil position, the pupil size, the direction of view, the accommodation status, and/or the fixation distance of the eye. Moreover, the optical system comprises an optical segmentation element, which is arranged between the projector unit and the diverting unit and by way of which the image content can be projected onto at least one projection region of the diverting unit via different imaging paths. In this case, at least some of the imaging paths can be actuated individually. In particular, the segmentation element is intended for generating a number of different imaging paths, said number corresponding to a number of segmentations/segments of the optical segmentation element. Furthermore, the optical system comprises the above-described control unit for actuating the actuable deflection device of the optical system.

In particular, a 'virtual retinal display' should be understood as a retinal scan display or a retinal projector, in which the image content is sequentially rasterized by deflecting at least one light beam, in particular a laser beam of at least one time-modulated light source, for example one or more laser diodes, and is imaged directly on the retina of the user's eye by optical elements. In particular, the image source is formed as an electronic image source, for example as a graphics output, in particular an (integrated) graphics card, a computer, a processor, or the like. By way of example, the image source can be formed integrally with the image processing device of the optical system. Alternatively, the image source can be formed separately from the image processing device and can transmit image data to the image processing device of the optical system. In particular, the image data are formed as color image data, e.g., RGB image data. In particular, the image data can be formed as non-moving or moving images, e.g., videos. Preferably, the image processing device is intended for modifying, in particular distorting, copying, rotating, offsetting, scaling, etc., the image data of the image source. Preferably, the image processing device is intended for generating copies of the image content that are in particular modified, for example distorted, rotated, offset, and/or scaled.

In particular, according to an example embodiment of the present invention, the projector unit is configured for emitting the image content from the image data in the form of scanned and/or rasterized light beams.

In particular, according to an example embodiment of the present invention, the diverting unit comprises an arrangement of optical elements, for example diffractive, reflective, refractive, and/or holographic optical elements. Preferably, however, the diverting unit always comprises at least one holographic optical element. The diverting unit is formed so as to be integrated in an eyeglass lens of a pair of smart glasses at least in part. In particular, the diverting unit is intended for diverting only part of the intensity of the projected image content onto the user's eye. At least one further part of the intensity of the projected image content passes through the diverting unit. The diverting unit appears substantially transparent to a user, at least when viewed from a perpendicular viewing direction. In particular, the diverting unit forms a projection region. In particular, the projection region forms a surface within which a light beam is deflected/diverted when it impinges on the diverting unit in the direction of the user's eye, in particular in the direction of an eye pupil surface of the optical system.

Preferably, according to an example embodiment of the present invention, the actuable deflection device comprises a first micromirror device having a first, horizontal scanning region and a second micromirror device having a second, vertical scanning region. In addition, in this context the first micromirror device is formed as a resonantly operated micromirror device, and the second micromirror device is formed as a quasi-static micromirror device.

Preferably, according to an example embodiment of the present invention, the optical segmentation element is implemented in the form of a segmenting lens, a segmenting mirror, a segmenting optical grating or volume hologram, or a beam splitter. As a result, simple and/or effective optical segmentation can be advantageously achieved.

Preferably, according to an example embodiment of the present invention, the eye status detection device is formed as an eye tracker device. In particular, the eye tracker device is formed as a component of the virtual retinal display, in particular of the optical system. Detailed embodiments of eye trackers are described in the related art, so they will not be discussed in more detail at this juncture.

In addition, according to an example embodiment of the present invention, it is proposed that the optical system comprises a pair of smart glasses having an eyeglass frame and eyeglass lenses. In this case, the at least one projector unit and the at least one segmentation element are arranged on the eyeglass frame, and the at least one diverting unit is arranged in the region of at least one eyeglass lens, in particular is integrated in at least one eyeglass lens. In this way, an advantageous embodiment of the smart glasses and/or an advantageous integration of the virtual retinal display can be achieved. In particular, the smart glasses can also comprise more than one projector unit, more than one segmentation element, and/or more than one diverting element, for example one for each eyeglass lens of the smart glasses.

BRIEF DESCRIPTION OF THE DRAWINGS

FIG. 3A shows an adjusted scanning region of an actuable deflection device, according to an example embodiment of the present invention.

FIG. 4 shows the sinusoidal tilt of a first micromirror device at two different times, according to an example embodiment of the present invention.

FIGS. 5A to 5C show sawtooth-like tilts of a second micromirror device, according to an example embodiment of the present invention.

DETAILED DESCRIPTION OF EXAMPLE EMBODIMENTS

Figure 1:
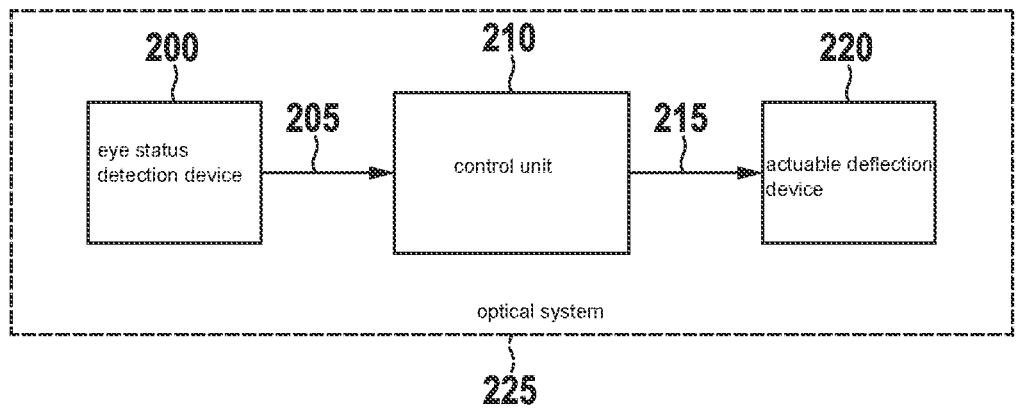
FIG. 1 shows a control unit for actuating an actuable deflection device of an optical system for a virtual retinal display, according to an example embodiment of the present invention.

FIG. 1 schematically shows a control unit 210 for actuating an actuable deflection device 220 of an optical system 225 for a virtual retinal display. In this context, the control unit 210 is configured for receiving, at a first time, a first eye status 205 of the user detected and/or determined using an eye status detection device 200. In addition, the control unit 210 is configured for generating first actuation signals 215 for the actuable deflection device 220 of the optical system 225 in such a way that the scanning region of the deflection device is adjusted in accordance with the detected and/or determined first eye status of the user. In particular, the control unit 210 is configured for performing the method shown in the subsequent FIG. 2 in the form of a flowchart.

Figure 2:
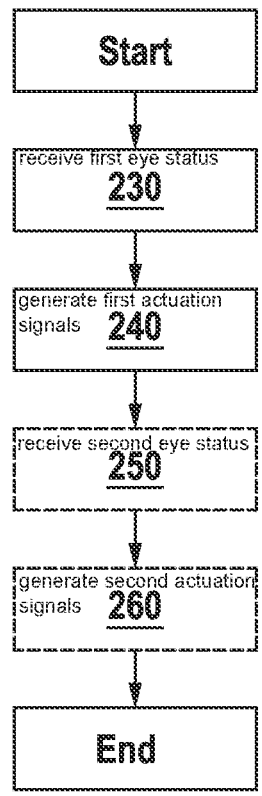
FIG. 2 shows a method for actuating an actuable deflection device of an optical system for a virtual retinal display, according to an example embodiment of the present invention.

In the method shown in FIG. 2 for actuating an actuable deflection device of an optical system for a virtual retinal display, the optical system comprises an image source, which delivers an item of image content in the form of image data, and an image processing device for the image data. In addition, the optical system comprises a projector unit comprising a time-modulable light source for generating at least one light beam and comprising the actuable deflection device for the at least one light beam for the scanning projection of the image content over a scanning region. In addition, the optical system comprises a diverting unit onto which the image content can be projected and which is configured for diverting the projected image content onto a user's eye in such a way that a plurality of exit pupils arranged so as to be spatially offset from one another and comprising the image content can be generated. Furthermore, the optical system comprises an eye status detection device for detecting and/or determining the eye status of the user. In particular, the eye status detection device is used for detecting and/or determining the movement of the eye, the speed of the eye movement, the pupil position, the pupil size, the direction of view, the accommodation status, and/or the fixation distance of the eye. Moreover, the optical system comprises the aforementioned optical segmentation element, which is arranged between the projector unit and the diverting unit and by way of which the image content can be projected onto at least one projection region of the diverting unit via different imaging paths. In this case, at least some of the imaging paths can be actuated individually. In addition, the optical system comprises the control unit shown in FIG. 1 at least for actuating the actuable deflection device. In the method in FIG. 2, in method step 230 a first eye status of the user, detected and/or determined using the eye status detection device, is received by way of the control unit at a first time. In a subsequent method step 240, first actuation signals are generated for the actuable deflection device using the control unit, in such a way that the scanning region of the deflection device is adjusted in accordance with the detected and/or determined first eye status of the user.

In an optional method step 250 following the method step 240, a second eye status of the user, detected and/or determined using the eye status detection device, is received by way of the control unit at a second time that follows the first time. In a subsequent method step 260, second actuation signals are generated for the actuable deflection device using the control unit, in such a way that the scanning region of the deflection device is adjusted in accordance with the detected and/or determined second eye status of the user. In this case, a second amplitude and/or a second frequency of a second tilt of the deflection device is changed compared with a first amplitude and/or a first frequency of a first tilt of the deflection device.

FIG. 3 shows an adjusted scanning region 270a of an actuable deflection device. In this case, the scanning region 270a is composed of a first, horizontal scanning region 285b of a first micromirror device (not shown here) of the deflection device and a second, vertical scanning region 285a of a second micromirror device (not shown here) of the deflection device. Moreover, four regions 275a to 275d can be seen, onto which image content generated using a projector unit is scanned. In this case, each region 275a to 275d is assigned to a respective segment (not shown here) of a segmentation lens. By way of the segmentation lens, the image content can be projected onto at least one projection region of a diverting unit (not shown here) via, in this case, four different imaging paths. Here, the original scanning region has been made smaller at the two outer edges 280a and 280b. The edges 280a and 280b are not needed to generate the image content and can accordingly be excluded from the scanning region 270a by adjusting the scanning region 270a.

Figure 3B:
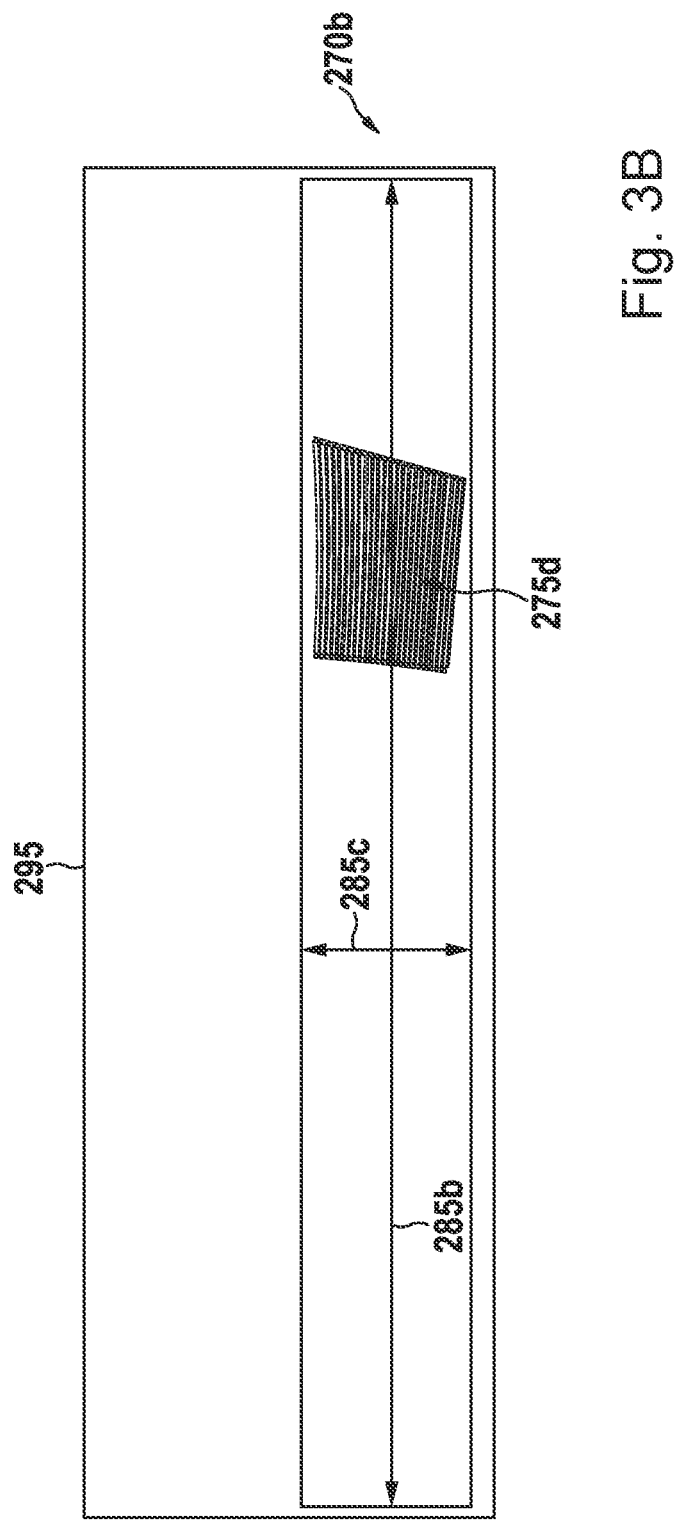
FIG. 3B shows another adjusted scanning region of the actuable deflection device, according to an example embodiment of the present invention.

By contrast with the illustration in FIG. 3A, FIG. 3B shows a scanning region in which a part of the vertical scanning region 285c has additionally been made smaller compared with the vertical scanning region 285a in FIG. 3A in accordance with the current pupil position of the user or the currently active eye box of the user. More specifically, the regions 275a and 275b, as the first imaging paths, shown in FIG. 3A have been excluded in their entirety from the scanning region 270b by making the vertical scanning region 285c smaller. In addition, the image data have been activated only for the region 275d as the second imaging path 275d of the different imaging paths 275a to 275c. Here, the image data for the region 275c have accordingly been blanked. The region 275d is assigned to the currently active eye box of the user as the imaging path and is accordingly located within the scanning region 270b of the deflection device.

FIG. 4 shows sinusoidal tilts 305 and 310 of a resonantly operated first micromirror device of an actuable deflection device of an optical system for a virtual retinal display. In this figure, the time is plotted in seconds on the x-axis 325 and the tilt angles of the first micromirror device, generated by associated third actuation signals, are plotted in radiants on the y-axis 300. In this case, at a first time, the first micromirror device is actuated in accordance with the detected and/or determined first eye status of the user by the third actuation signals (not shown here), which lead to the sinusoidal tilt 305. The tilt 305 has a first amplitude 315. By contrast, at a second time that follows the first time, the first micromirror device is actuated in accordance with a detected and/or determined second eye status of the user by the further third actuation signals (not shown here), which belong to the tilt 310. In this case, the tilt 310 has a second amplitude 320 that is greater than the first amplitude 315. The frequency of the two shown tilts 305 and 310 is 20 kHz. The first micromirror device assigned to the tilts 305 and 310 is responsible for the horizontal scanning region of the deflection device.

FIG. 5A to 5C show different sawtooth-like micromirror tilt curves of a quasi-static second micromirror device of an actuable deflection device of an optical system for a virtual retinal display.

In this regard, FIG. 5A shows the unadjusted curve of sawtooth-like tilts 350a of a quasi-statically operated second micromirror device of an actuable deflection device of an optical system for a virtual retinal display. In this figure, the time is plotted in seconds on the x-axis 330 and the tilt angle of the second micromirror device is plotted on the y-axis 335. In the switching period 345, the second micromirror quickly switches from one side to the other. The second micromirror device assigned to the shown tilt 350a is responsible for the vertical scanning region of the deflection device and has a frequency of 60 Hz. This is also the case in FIGS. 5B and 5C.

In FIG. 5B, at a first time, the second micromirror device is actuated in accordance with a detected and/or determined first eye status of the user by fourth actuation signals (not shown here), which lead to positive sawtooth-like tilts 350b. By contrast, at a second time that follows the first time, the second micromirror device is actuated in accordance with a detected and/or determined second eye status of the user by further fourth actuation signals (not shown here), which lead to negative sawtooth-like tilts 350c. The switch between the tilts 350b and 350c occurs in the switching period 345 and takes the same amount of time as in FIG. 5A.

By contrast with the above-described micromirror tilt curves, FIG. 5C shows a tilt 350d having positive angular tilts at a first time in accordance with a detected and/or determined first eye status of the user. At a second time, the micromirror tilt curve is transferred into a tilt 350e having negative angular tilts in accordance with a detected and/or determined second eye status of the user. The switch occurs in the switching period 345 in this case too, but it takes less time compared with the switch in FIG. 5B since the micromirror need not be moved entirely from one side to the other.

Figure 6:
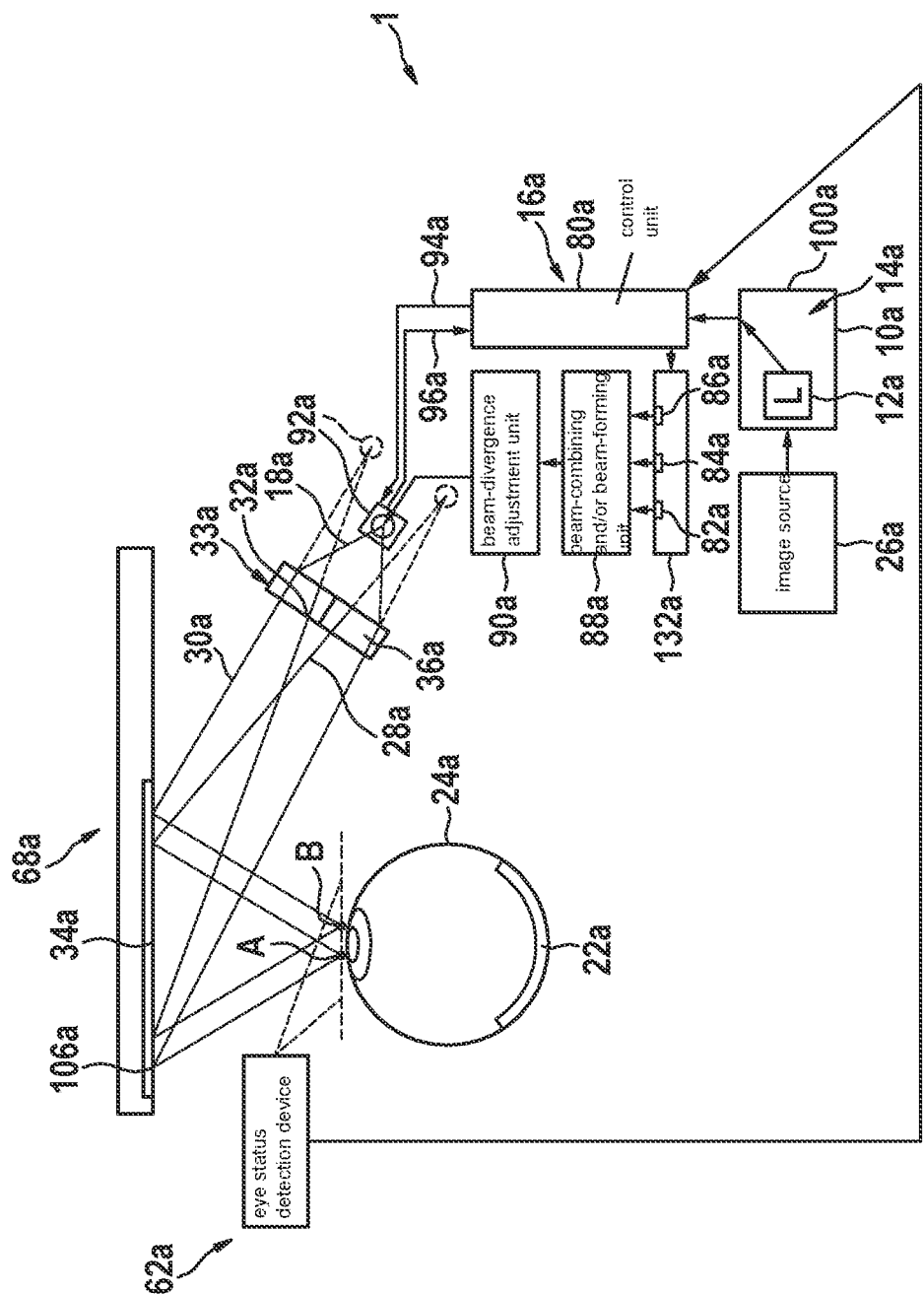
FIG. 6 shows an optical system for a virtual retinal display, according to an example embodiment of the present invention.

FIG. 6 schematically shows an optical system 1 for a virtual retinal display (retinal scan display). In this figure, the optical system 1 comprises an image source 26a, which delivers an item of image content in the form of image data 12a. In addition, the optical system 1 comprises an image processing device 10a for the image data 12a. Moreover, the optical system comprises a projector unit 16a comprising a time-modulable light source 132a for generating at least one light beam 18a and comprising an actuable deflection device 92a for the at least one light beam 18a for the scanning projection of the image content over a scanning region. The actuable deflection device 92a is configured for deflecting the laser beam 18a in a controlled manner to generate a raster image. Moreover, the optical system 1 comprises a diverting unit 106a in the form of a holographic optical element, onto which the image content can be projected and which is configured for diverting the projected image content onto an eye 24 of a user in such a way that a plurality of exit pupils (eye boxes A, B) arranged so as to be spatially offset from one another and comprising the image content can be generated. The diverting unit 20a is configured for influencing (refracting, scattering, and/or reflecting) the light beams 18a in such a way that at least part of the light beams 18a, preferably at least one image generated from the image data 12a, is imaged on the eye pupil surface 54a of the optical system 68a, in particular on the retina 22a of the user's eye 24a. In the exemplary embodiment shown, the diverting unit 20a is integrated in an eyeglass lens 68a. In addition, the optical system 1 comprises an eye status detection device 62a for detecting and/or determining the eye status of the user, in particular for detecting and/or determining the movement of the eye, the speed of the eye movement, the pupil position, the pupil size, the direction of view, the accommodation status, and/or the fixation distance of the eye 24a. In the exemplary embodiment shown, the eye status detection device is formed as an eye tracker device. Moreover, the optical system comprises an optical segmentation element 33a, which is arranged between the projector unit 16a and the diverting unit 106a and by way of which the image content can be projected onto at least one projection region 34a of the diverting unit 106a via different imaging paths 28a and 30a. In this case, the separate imaging paths 28a and 30a can be actuated individually. In the exemplary embodiment shown, the segmentation element 33a is formed as a segmenting lens having a first segment 32a and a second segment 36a. In addition, the optical system 1 comprises a control unit 80a, as shown by way of example in FIG. 1. The control unit 80a is configured for receiving, at a first time, a first eye status of the user detected and/or determined using the eye status detection device 62a. In addition, the control unit 80a is configured for generating first actuation signals 94a for the actuable deflection device of the optical system in such a way that the scanning region of the deflection device is adjusted in accordance with the detected and/or determined first eye status of the user. The actuable deflection device 92a regularly sends its current position signals back to the projector control unit 80a (see arrow 96a).

In the case shown, the actuable deflection device 92a comprises a first micromirror device (not shown) having a first, horizontal scanning region and a second micromirror device (not shown either) having a second, vertical scanning region. In this regard, the first micromirror device is formed as a resonantly operated micromirror device, and the second micromirror device is formed as a quasi-static micromirror device.

Moreover, the control unit 80a is intended for controlling the generation and/or modulation of the light beams 18a by the light source 132a in an open-loop or closed-loop manner. In the exemplary embodiment shown, the light source 132a comprises three (amplitude-modulable) laser diodes 82a, 84a, 86a. A first laser diode 82a generates a red laser beam. A second laser diode 84a generates a green laser beam. A third laser diode 86a generates a blue laser beam. The projector unit 16a has a beam-combining and/or beam-forming unit 88a. The beam-combining and/or beam-forming unit 88a is configured for combining, in particular mixing, the different-colored laser beams from the laser diodes 82a, 84a, 86a to generate a color image. The beam-combining and/or beam-forming unit 88a is configured for forming the light beam 18a, in particular the laser beam, that leaves the projector unit 16a. Details on the configuration of the beam-combining and/or beam-forming unit 88a are described in the related art. The projector unit 16a comprises a beam-divergence adjustment unit 90a. The beam-divergence adjustment unit 90a is intended for adjusting a beam divergence of the light beam 18a, in particular the laser beam, that leaves the projector unit 16a, preferably for adjusting it to a path length of the light beam 18a currently being emitted, said path length in particular being dependent on an arrangement of optical elements of the optical system 68a. The beam divergence of the light beams 18a, in particular laser beams, leaving the projector unit 16a is preferably adjusted such that, once the optical elements of the optical system 68a have been passed, a sufficiently small and sharp laser spot is produced at the site at which the beam impinges on a retina 22a of an eye 24a of a user of the virtual retinal display, and the beam divergence is at least substantially constant at the site of an eye pupil surface 54a of the optical system 68a in front of the user's eye 24a over the entire imaging, generated by the light beam 18a, in particular the laser beam, of the image data 12a. Details on the configuration of the beam-divergence adjustment unit 90a, e.g., using lenses having a fixed and/or variable focal length, are described in the related art.

Figure 7:
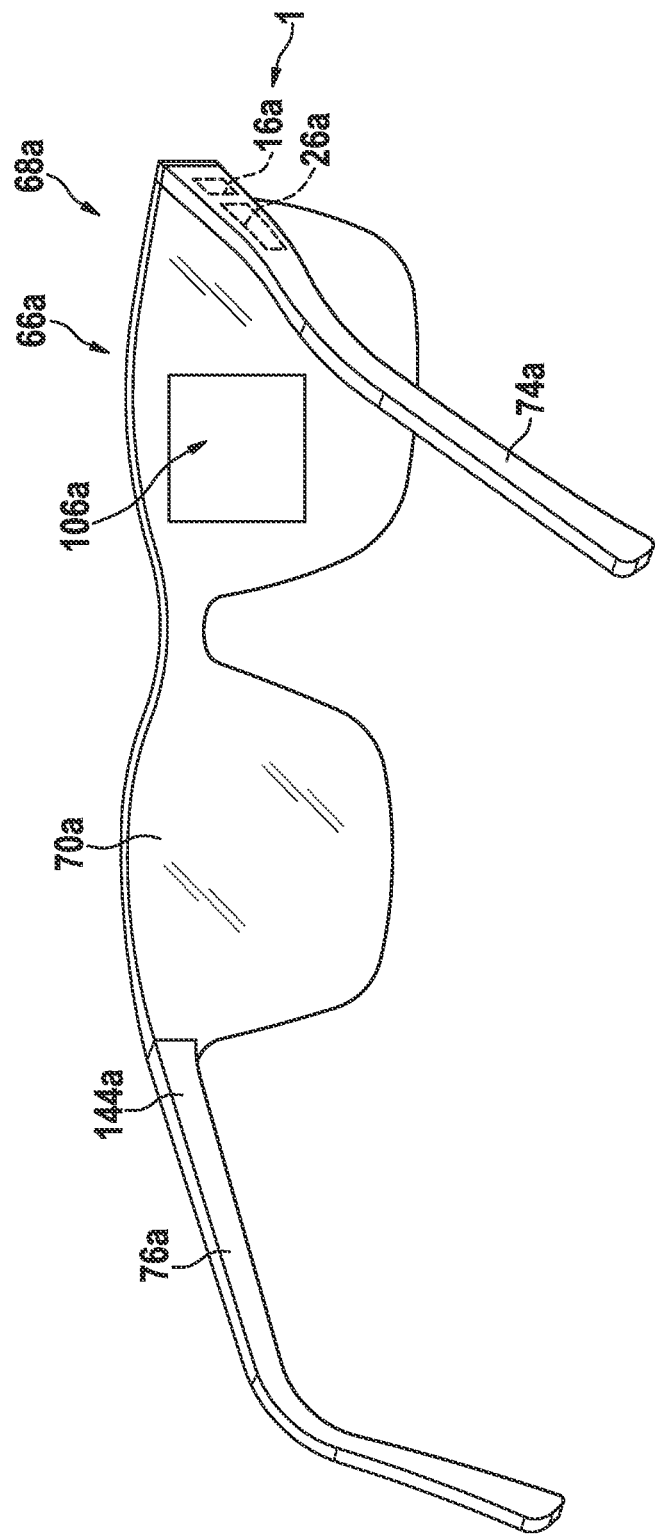
FIG. 7 shows a pair of smart glasses, according to an example embodiment of the present invention.

FIG. 7 is a schematic illustration of the optical system 1 comprising a pair of smart glasses 66a. The smart glasses 66a have eyeglass lenses 70a, 68a. The eyeglass lenses 70a, 68a are largely transparent. The smart glasses 66a have an eyeglass frame 144a having eyeglass arms 74a, 76a. The smart glasses 66a form part of the optical system 1. Alternatively, the smart glasses 66a can also form the optical system 1 in its entirety.

What is claimed is:

1. A method for actuating an actuable deflection device of an optical system for a virtual retinal display, the optical system including:
    an image source that delivers an item of image content in the form of image data;
    an image processing device for the image data;
    a projector unit including a time-modulable light source configured to generate at least one light beam and including the actuable deflection device for the at least one light beam for the scanning projection of the image content over a scanning region;
    a diverting unit onto which the image content can be projected and which is configured to divert the projected image content onto an eye of a user in such a way that a plurality of exit pupils arranged so as to be spatially offset from one another and including the image content can be generated;
    an eye status detection device configured to detect and/or determine an eye status of the user, including to detect and/or determine a movement of the eye, and/or a speed of an eye movement and/or a pupil position and/or a pupil size and/or a direction of view and/or an accommodation status and/or a fixation distance of the eye;
    an optical segmentation element arranged between the projector unit and the diverting unit and using which the image content can be projected onto at least one projection region of the diverting unit via different imaging paths, wherein at least some of the different imaging paths can be actuated individually;
    a control unit configured at least to actuate the actuable deflection device;
    wherein the method comprises the following steps:
        receiving a first eye status of the user, detected and/or determined using the eye status detection device, using the control unit at a first time; and
        generating first actuation signals for the actuable deflection device using the control unit, in such a way that the scanning region of the actuable deflection device is adjusted in accordance with the detected and/or determined first eye status of the user.

2. The method as recited in claim 1, wherein the scanning region of the deflection device includes a first, horizontal scanning region of a first micromirror device of the deflection device, and a second, vertical scanning region of a second micromirror device of the deflection device.

3. The method as recited in claim 2, wherein the first actuation signals are generated such that:
    the first and/or the second micromirror device is tilted sinusoidally, and/or the first and/or the second micromirror device is/are tilted in the manner of a sawtooth.

4. The method as recited in claim 2, wherein the scanning region of the deflection device is adjusted such that at least one part of the horizontal scanning region and/or at least one part of the vertical scanning region is made smaller or made larger or displaced.

5. The method as recited in claim 1, wherein each of the different imaging paths is assigned a respective exit pupil including the image content, the scanning region of the deflection device being adjusted such that at least one part of a first imaging path of the different imaging paths of the optical segmentation element is excluded from the scanning region of the deflection device.

6. The method as recited in claim 5, wherein the scanning region of the deflection device is adjusted such that at least the first imaging path of the optical segmentation element is excluded in its entirety from the scanning region of the deflection device.

7. The method as recited in claim 5, wherein the image data are activated for only one second imaging path of the different imaging paths, the second imaging path being located within the scanning region of the deflection device.

8. The method as recited in claim 1, wherein the different imaging paths of the optical segmentation element include at least four different imaging paths of the optical segmentation element.

9. The method as recited in claim 1, wherein the first eye status of the user is detected and/or determined using an eye tracker device as the eye status detection device.

10. The method as recited in claim 1, further comprising the following steps:
receiving a second eye status of the user, detected and/or determined using the eye status detection device, using the control unit at a second time that follows the first time; and
generating second actuation signals for the actuable deflection device using the control unit, in such a way that the scanning region of the deflection device is adjusted in accordance with the detected and/or determined second eye status of the user, a second amplitude and/or a second frequency of a second tilt being changed compared with a first amplitude and/or a first frequency of a first tilt of the deflection device.

11. A control unit configured to actuate an actuable deflection device of an optical system for a virtual retinal display, the control unit comprising:
a processor configured to receive, at a first time, a first eye status of a user detected and/or determined using an eye status detection device, and to generate first actuation signals for the actuable deflection device of the optical system in such a way that a scanning region of the deflection device is adjusted based on the detected and/or determined first eye status of the user,
wherein the processor is further configured to receive a second eye status of the user, detected and/or determined using the eye status detection device, using the control unit at a second time that follows the first time, and to generate second actuation signals for the actuable deflection device using the control unit, in such a way that the scanning region of the deflection device is adjusted in accordance with the detected and/or determined second eye status of the user, a second amplitude and/or a second frequency of a second tilt being changed compared with a first amplitude and/or a first frequency of a first tilt of the deflection device.

12. An optical system for a virtual retinal display, comprising:
an image source that delivers an item of image content in the form of image data;
an image processing device for the image data;
a projector unit including a time-modulable light source configured to generate at least one light beam and including an actuable deflection device for the at least one light beam for the scanning projection of the image content over a scanning region;
a diverting unit onto which the image content can be projected and which is configured to divert the projected image content onto an eye of a user in such a way that a plurality of exit pupils arranged so as to be spatially offset from one another and including the image content can be generated;
an eye status detection device configured to detect and/or determine an eye status of the user, including to detect and/or determine a movement of the eye, and/or a speed of the eye movement, and/or a pupil position, and/or a pupil size, and/or a direction of view, and/or an accommodation status, and/or a fixation distance of the eye;
an optical segmentation element arranged between the projector unit and the diverting unit and by way of which the image content can be projected onto at least one projection region of the diverting unit via different imaging paths, wherein at least some of the different imaging paths can be actuated individually;
a control unit configured to:
receive, at a first time, a first eye status of a user detected and/or determined using the eye status detection device, and
generate first actuation signals for the actuable deflection device of the optical system in such a way that a scanning region of the actuable deflection device is adjusted based on the detected and/or determined first eye status of the user.

13. The optical system as recited in claim 12, wherein the actuable deflection device includes a first micromirror device having a first, horizontal scanning region and a second micromirror device having a second, vertical scanning region.

14. The optical system as recited in claim 13, wherein the first micromirror device is formed as a resonantly operated micromirror device, and the second micromirror device is formed as a quasi-static micromirror device.

15. The optical system as recited in claim 12, wherein the optical segmentation element is a segmenting lens, or a segmenting mirror, or a segmenting optical grating or volume hologram, or a beam splitter.

16. The optical system as recited in claim 12, wherein the eye status detection device is an eye tracker device.

17. The optical system as recited in claim 12, further comprising a pair of smart glasses having an eyeglass frame and eyeglass lenses, wherein the projector unit and the optical segmentation element are arranged on the eyeglass frame, and the diverting unit is integrated in at least one eyeglass lens of the eyeglass lenses.

* * * * *